Jan. 29, 1946.    W. M. YUILL    2,393,853
METHOD OF AND APPARATUS FOR PACKING OR CANNING
FOOD AND OTHER PLASTIC SUBSTANCES
Filed Aug. 13, 1943    3 Sheets—Sheet 3

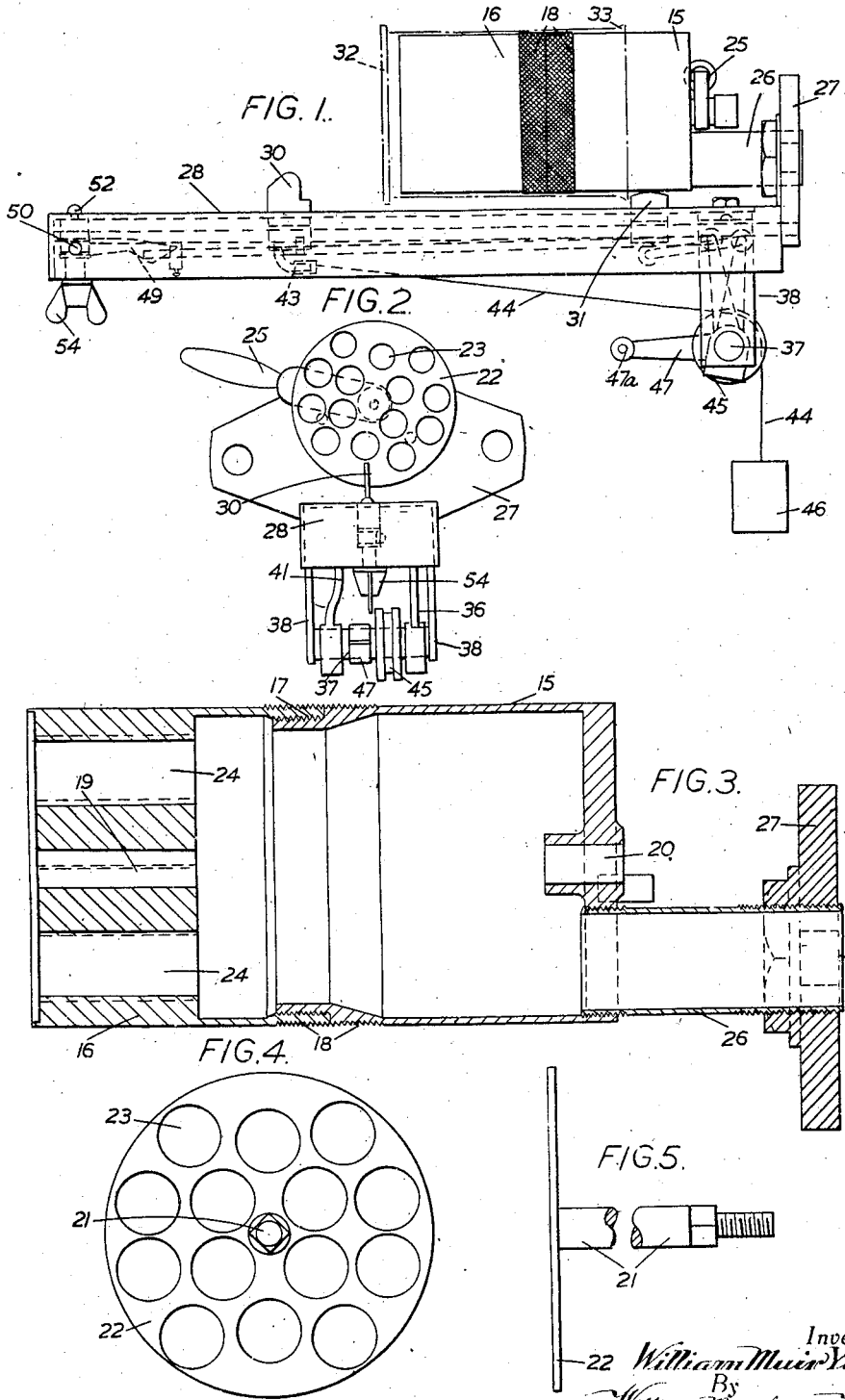

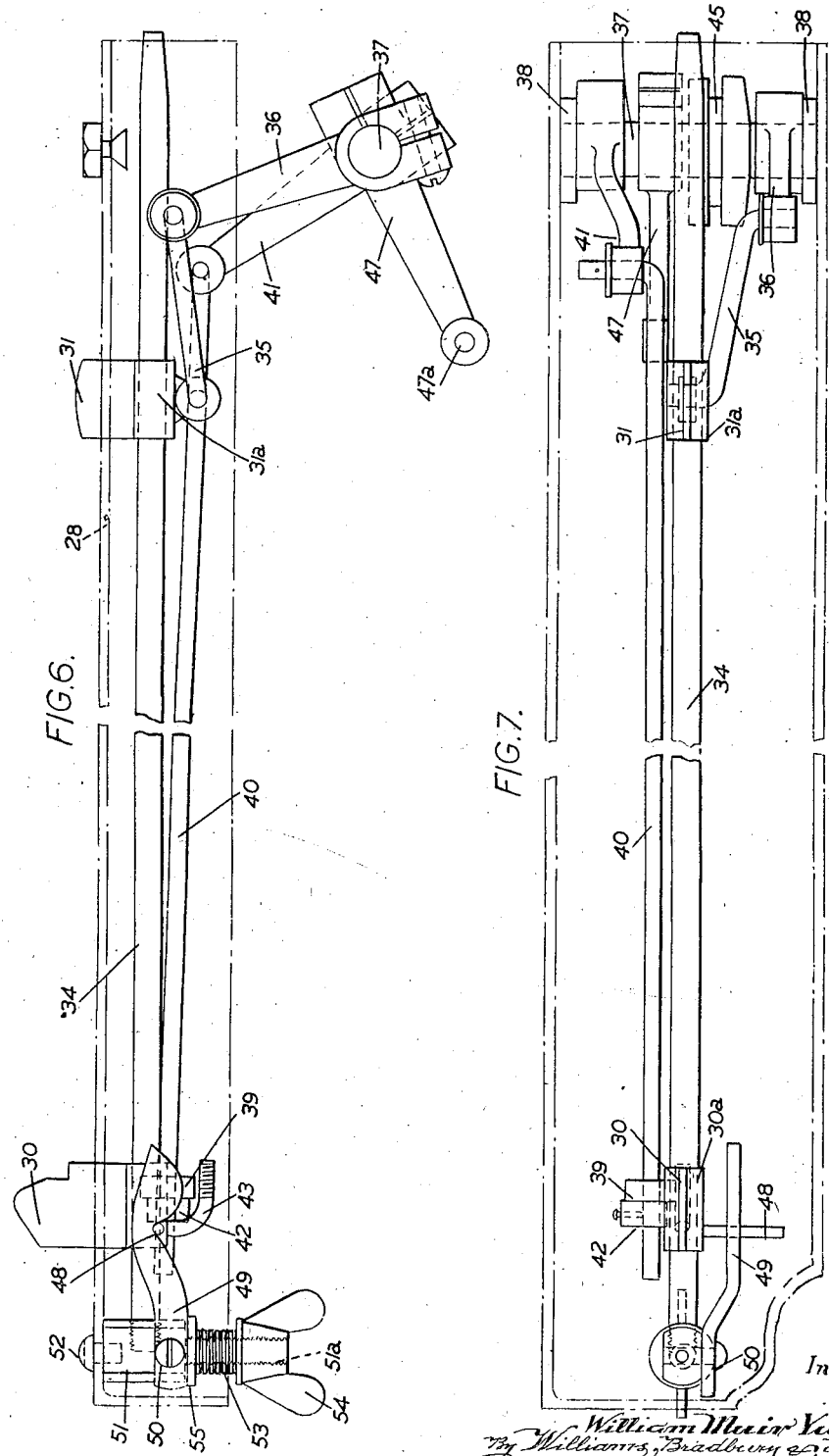

Inventor:
William Muir Yuill
By Williams, Bradbury & Hinkle
Attorneys.

Patented Jan. 29, 1946

2,393,853

UNITED STATES PATENT OFFICE 2,393,853

METHOD OF AND APPARATUS FOR PACKING OR CANNING FOOD AND OTHER PLASTIC SUBSTANCES

William Muir Yuill, Edinburgh, Scotland

Application August 13, 1943, Serial No. 498,600
In Great Britain March 25, 1943

10 Claims. (Cl. 17—32)

This invention relates to a new or improved method of packing or canning food or other plastic substances. My invention is particularly concerned with the rapid packaging of skinless or casingless meat sausages in cans or other containers or wrappers, each being filled with a plurality of skinless sausages, but it is to be understood that my invention is also applicable to the packaging of other plastic food substances or to the packaging of any plastic substance capable of being extruded through dies and of retaining its shape when so extruded.

The method of the present invention consists in telescoping a can or other receptacle, which may be a paper wrapper or other container, over a freely supported extrusion die containing a plurality of open-ended elongated passages through which the plastic substance can be extruded, the can, cup, wrapper or other receptacle being telescoped over the die until the base of the receptacle contacts the end face of the die, whereupon the plastic substance is pressed through the die, causing the extruded material to press the receptacle outwards away from the die until the desired length of sausages has been extruded from the die, whereupon the pressure on the plastic substance entering the die is released and a cutter is thereafter moved across the end face of the die to sever the sausages, leaving a plurality of skinless or casingless sausages of the plastic substance within the can, wrapper, cup or other receptacle.

Separate cans or like containers may thus be filled one after another in rapid succession with skinless sausages, and the cans or like containers may be sealed in known manner. If the sausages are to be preserved in sealed cans or like containers, the sausages in the cans must be slightly shorter than the depth of the can. This necessitates the severing of the material exuding from the die before the can completely leaves the die, and for this purpose it is necessary that an internally operating cutter be employed, which will operate within the can when the latter has been nearly filled. A cutter suitable for this purpose and capable of operation from outside the die is disclosed in my prior copending Patent No. 2,363,218, issued on November 21, 1944.

My invention can be applied in like manner to the filling of cartons or cups made of paper, pulp-board or like material, the carton or cup being subsequently closed or sealed with a cap or cover.

The present invention also enables wrapped packages of skinless sausages to be produced in a rapid and simple manner by simply filling a can, cup or like receptacle with a plurality of skinless sausages in the manner already described, then emptying the pack of sausages out of the can or the like and wrapping the pack in wrapping paper or other suitable wrapping material. Thus the same can or like receptacle can be repeatedly filled and emptied, the packs of sausages emptied from the can or like receptacle being subsequently wrapped.

My invention also contemplates a further and still more simplified method of producing wrapped packages of sausages. According to this further development of my invention, wrapping paper or other suitable wrapping material is first wrapped around the die in the form of a cup over the end of the die and bearing against the end face of the die. The plastic substance is then extruded through the die, displacing the paper wrapper outwards until the desired length of material has exuded from the die. If the paper wrapper is to be only partly filled, so that the open end of the wrapper can be closed to completely enclose the sausages, the material exuding from the die must be severed by an internally operating cutter and the pressure on the material entering the die must be released before the paper wrapper completely leaves the die and before the cutter is operated, in the manner described above for the packing of cans which are to be subsequently sealed. Alternatively, the material may be allowed to exude from the die until the paper wrapper is completely displaced from the die. The pressure on the material entering the die can then be released and the exuding material can thereafter be severed by the use of any suitable knife or cutter. The pack of sausages thus contained in the paper wrapper may be either sold in this condition, leaving the pack of sausages at the open end of the wrapper unwrapped, or this end of the wrapper may be separately wrapped. Thus wrapped or partially wrapped packs of sausages can be produced in a rapid and efficient manner.

For convenience of manipulating the wrapper after it has been wrapped around the die, a can, carton or other rigid container may be telescoped over the wrapper. This holds and supports the wrapper while it is receiving the sausages and receding from the die, and after the sausages have been cut to length, the can, carton or other rigid container can be withdrawn from the wrapper, leaving the latter with the pack of sausages therein. The same can, carton or other rigid container can then be used again to support another wrapper around the die.

My invention further contemplates the provision of means for canning sausages or for producing packs of sausages all of a predetermined weight, determined by the length of material exuded from the die in forming a pack, and for this purpose I provide, in combination with the die, a movable starting member adapted to contact the receptacle to be filled when the latter is telescoped over the die and adapted to actuate means for starting the press to force the material through the die, and a movable stopping member adapted to contact the receptacle being filled and, after the latter has receded through a predetermined distance from the die, to actuate means for stopping the press to release the pressure on the material entering the die.

Although the term "sausage" is generally used to denote minced meat enclosed in a thin casing or skin, it is to be understood as defining a casingless or skinless rod or strip of any plastic material capable of retaining its shape when expressed through a die, whether the die openings are circular, oval, rectangular, or of other shape in cross-section.

An apparatus for carrying out the method of the present invention may comprise a filler casing supporting the plural-apertured die at one end thereof and having an inlet branch at or near its other end for connection to an extrusion press, the filler casing being supported or suspended so that a can, cup, paper wrapper or other receptacle can be telescoped over the die end of the filler casing, in combination with a guide secured in parallel relationship to the filler casing and extended beyond the die, a starting member movably mounted on said guide adjacent the side of the filler casing, and a stop member longitudinally movable on the guide extension for engaging the closed end of the receptacle which is being filled, said members being operatively connected to means for starting and stopping the extrusion press. The stop member may also be arranged to actuate mechanism for subsequently operating a cutter across the face of the die.

The apparatus may be either vertically or horizontally arranged, or disposed in an inclined position. If the apparatus is vertically arranged, the can or other receptacle to be filled may be supported on a shelf movable up and down the guide for the starting and stop members. If the apparatus is arranged in a horizontal or slightly inclined position, the guide for said members may be in the form of a shelf or tray on which the receptacle to be filled rests and travels during the filling operation.

The die and its supporting filler casing may be either round or rectangular in cross-section according to the shape of the cans, cartons, cups, wrappers or other containers to be filled.

In the specification of my prior patent, the apertured cutter is mounted on a central spindle, but if the extrusion passages includes a central passage in a cylindrical die, the apertured cutter may be carried by a sleeve rotatably mounted on the die or on its supporting filler casing.

In order that the invention may be more clearly understood, reference is hereinafter made to the accompanying explanatory drawings, whereon:

Fig. 1 is a side view of an apparatus for carrying out the method of the present invention including measuring mechanism for producing packs of sausages of a predetermined weight. The can to be filled is shown in broken lines in position on the die. Fig. 2 is an end view looking from the left in Fig. 1.

Fig. 3 is a sectional side elevation of the die and filler casing. Fig. 4 is a face view, and Fig. 5 is an edge view of the cutter showing its attached spindle partly broken away.

Fig. 6 is a side view and Fig. 7 a top plan view of the measuring mechanism for determining the weight of the pack of sausages. In both Figs. 6 and 7 the shelf is indicated in phantom lines.

Figure 10:
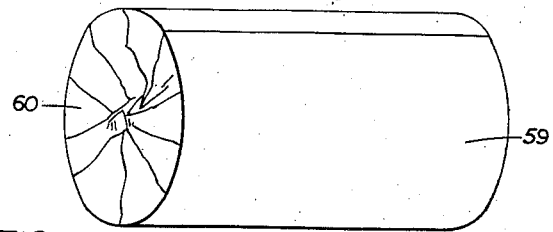
Figure 11:
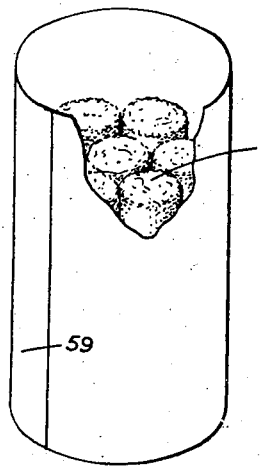
Figure 12:
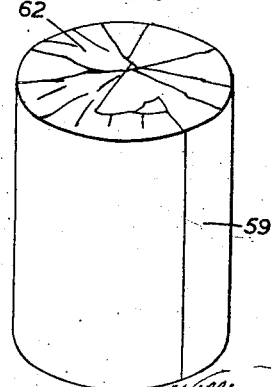

Fig. 10 is a perspective view of the wrapper. Fig. 11 is a perspective view of the wrapper, part being broken away to show the pack of sausages. Fig. 12 is a perspective view of the wrapped pack.

Referring firstly to Figs. 1 to 8, the apparatus there shown comprises a filler casing 15 to one end of which the apertured die 16 is fitted, as by a screw-threaded connection 17. The casing 15 and die 16 may be externally milled at 18 for convenience of removing the die when the apparatus is to be cleaned. A central hole 19 through the die and a central hole 20 in the end of the filler casing receiving a spindle 21 (Fig. 5) which carries the disc cutter 22 mounted to move over the end face of the die. The cutter 22 has a plurality of holes 23 which register with a corresponding series of passages 24 in the die. A handle 25 is mounted on the rear end of the spindle 21.

Into the rear end of the filler casing 15 there extends an inlet pipe 26 which is adapted for connection to the outlet connection of a meat press. The means for coupling the pipe 26 to the meat press will depend upon the form of outlet from the press. On the drawings I have shown the pipe 26 fitted with a flange coupling member 27 and the apparatus is shown horizontally disposed, and provided with a shelf 28 which is fixed or welded at its rear end to the flange 27. The shelf 28 has a central longitudinal slot 29 (Fig. 8) through which project two stop members 30 and 31. The stop member 30 is adapted to be engaged by the base of the can to be filled, which is shown at 32 in broken lines in Fig. 1. The stop member 31 is adapted to be engaged by the rim 33 of the can. Stop members 30 and 31 project upwards from sleeves 30a and 31a which slide on a fixed central rod 34 below the shelf 28. Sleeve 31a is linked by a cranked rod 35 to a lever 36 fixed to a transverse spindle 37 supported in a bracket 38 from the shelf 28. Attached to one side of the sleeve 30a of stop member 30 is an eye 39 which slides on a movable rod 40 the rear end of which is linked to a lever 41 fixed on spindle 37. The front end of rod 40 carries an adjustably fixed abutment or collar 42 which limits forward travel of eye 39 and stop member 30. The sleeve 30a also has a bent arm 43 for the attachment thereto of a wire (or chain) 44 (Fig. 1) which passes over a pulley 45 on spindle 37 to a weight 46. A third lever 47 fixed to spindle 37 is adapted to be connected at 47a to means for stopping and starting the meat press.

The method of operation is as follows: The flange 27 is connected to the meat outlet of the press and the lever 4. is connected to the press starting and stopping lever. When a can 32 is telescoped over the die and filler casing as indicated in Fig. 1 until the can rim 33 strikes the stop 31, the latter slides back on rod 34, thus rocking lever 36 and spindle 37 to raise end 47a of lever 47 and start the meat press. The meat is then forced into the filler casing 15 and through the die 16 and cutter 22 into the can 32, which recedes under the pressure of the extruded meat, with the base of can 32 moving stop 30 forwards or away from the die. When the stop 30 reaches a predetermined position, the eye 39 which moves with the said stop strikes the collar 42 on rod 40. The rod 40 is thus moved to the left, rocking lever 41 and spindle 37 in a direction to lower end 47a of lever 47, thus stopping the meat press. The operator then swings handle 25 through about 180°, thus rotating the cutter 22 to sever the sausages in the can from the meat in the die. The rim 33 of the can is still in engagement with the outside of the die, so that it is necessary to pull the can further forwards to release it from the die and to enable the can to be removed. This further forward movement of the can 32 causes a pin or projection 48 on the sleeve 30a to ride under and be engaged by a catch or detent 49 pivoted at 50 on a block 51 which is fixed by a screw 52 to the underside of shelf 28. Rod 34 is fixed at its forward end in block 51. A threaded rod 51a depending from block 51 carries a spring 53 pressed by a wing nut 54 against a washer 55 which bears on pivoted end of catch 49. When a fresh can is telescoped over the die, the rim 33 of the can presses the stop 31 backwards, thus rocking lever 36 clockwise. This also rocks lever 41, pulling on rod 40 and and causing the collar 42 on rod 40 to move eye 39 of stop 30 to the right in Figs. 6 and 7. As already described, eye 39 is attached to sleeve 30a of stop 30, so that the pin 48 is urged towards the right and is forced from under the detent 49, movement of the latter being permitted by the spring-controlled washer 55. The weight 46 thereupon pulls the stop 30 to the right until it contacts the base of can 32. Further telescoping movement of the can over the die causes stop 31 to continue to rock lever 36 until the lever 47 is moved into the position in which the press is started.

Figure 8:
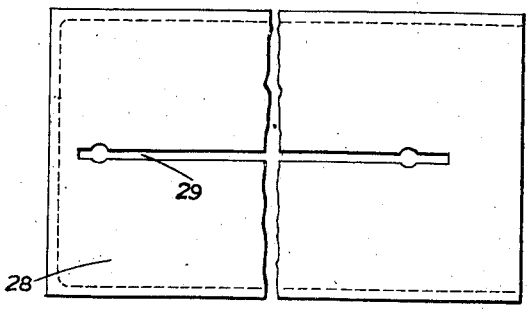
Fig. 8 is a broken plan view of the shelf which supports the measuring mechanism and the can to be filled.
Figure 9:
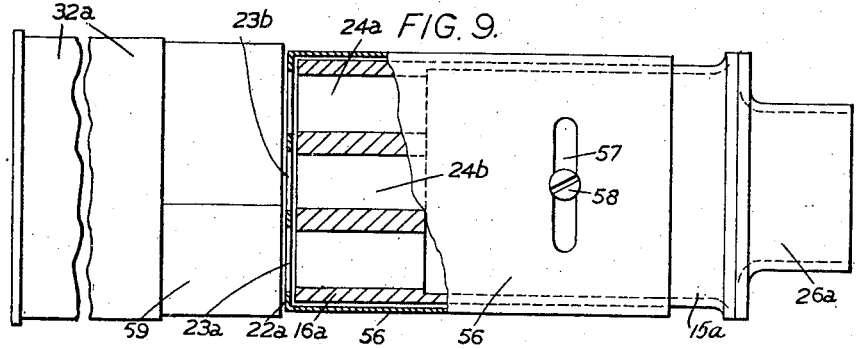
Fig. 9 is a side view of a simpler apparatus for carrying out the method of the present invention and showing a can supporting and holding a paper wrapper.

Referring now to the simpler form of apparatus illustrated in Fig. 9, the filler casing 15a has an inlet connection 26a for connection to the meat press. The disc cutter 22a is carried at one end of a tube or sleeve 56 which is rotatable on the die 16a and casing 15a. A transverse slot 57 in the sleeve 56 guides a radial pin 58 projecting from the filler casing 15a. In this case, the severing of the sausages is effected by turning the sleeve 56 on the casing 15a, until the pin 58 reaches one end or the other of slot 57. This construction may be adopted in cases where the die passages 24a include a central die passage 24b, in which case the cutter has a central hole 23b to register with passage 24b in addition to the holes 23a which register with the passages 24a.

The apparatus comprising the filler casing 15, die head 16 and cutter 22 illustrated in Figs. 1 and 2 may be used, like the apparatus illustrated in Fig. 9, without the measuring mechanism including the shelf 28, stops 30 and 31 and their associated parts. Likewise, the apparatus illustrated in Fig. 9 may be combined with the measuring mechanism including the shelf 28, stops 30 and 31 and their associated parts illustrated in Figs. 1 and 2 and 6 to 8.

a paper wrapper. In such case, the paper wrapper is first wrapped around the die head 16 (Fig. 1) or around the sleeve 56. One end of the wrapper is then folded in against the face of cutter 22 or 22a, thus forming a paper cup having a cylindrical body portion 59 with one end closed by folding as at 60 in Fig. 10. This paper cup telescoped over the die head 16 or cutter sleeve 56 may then be supported by telescoping a can or other rigid receptacle over the paper wrapper as indicated at 32a in Fig. 9, which shows the paper wrapper and its enclosing receptacle 32a withdrawn from the sleeve 56. After the sausages have been delivered into the paper wrapper and the latter with the receptacle 32a has been withdrawn as in Fig. 9, the paper wrapper with its contained sausage pack 61 may be separated from the receptacle as shown in Fig. 11 and the open end of the body of the wrapper may be folded in or closed over the pack of sausages as indicated at 62 in Fig. 12.

If the apparatus is used without the shelf 28 and associated measuring mechanism, the can or wrapper to be filled, or a can or other receptacle in which the wrapper is supported, may be held and supported by one hand of the operator during the filling operation, to guide and support the can or wrapper as it recedes from the die. In this case, the meat may be allowed to exude from the die until the length of the extruded sausages is greater than the length of the can or wrapper to be filled; that is to say, severing of the sausages from the die may be delayed until after the can or wrapper has completely receded from the die and until any desired length of sausage has been delivered. The cutter can thereupon be operated, or the operator may use a hand knife or hand cutter to sever the sausages from the die. It will be apparent therefore that in a still simpler form of my invention, the provision of a cutter such as 22 or 22a is not essential, as an ordinary hand knife or other suitable hand cutter may be used. As the pack of sausages will in such case project out of the can or wrapper, the pack may be turned out of the can and wrapped, or the partially wrapped sausages may be subsequently wrapped to enclose their protruding ends.

I claim:

1. An apparatus for producing packs of casing-less sausages all of a predetermined weight which comprises a filler casing supporting a plural-apertured die at one end and having an inlet branch for connection to an extrusion press, means for supporting the filler casing so that a wrapper or receptacle can be wrapped around or telescoped over the die, a guide secured in parallel relationship to the filler casing and extended beyond the die, a starting member movably mounted on said guide adjacent the side of the filler casing and adapted to be moved by the rim of a receptacle telescoped over the die, a stopping member longitudinally movable on the guide extension for abutment against the closed end or base of the said receptacle, and means operatively connecting said members to means for starting and stopping the extrusion press.

2. Apparatus as claimed in claim 1 in which the guide forms a shelf or support on which the receptacle to be filled rests and travels during the filling operation.

3. Apparatus as claimed in claim 1 in which the die is cylindrical and includes a central die passage, and an apertured cutter rotatable over the end face of the die is carried by a sleeve concentric with and rotatably mounted on the die.

means operatively interconnecting the members to cause the final receding movement of the stopping member to return the starting member to its initial position and to cause movement of the starting member from its initial position to move the stopping member in the same direction.

5. Apparatus as claimed in claim 1 including tension means tending to move the stopping member towards the die to hold it against the closed end or base of the receptacle, a detent for releasably retaining the stopping member at the outer end of its travel, and means operatively interconnecting the members whereby final outward movement of the stopping member returns the starting member to its initial position and movement of the starting member from its initial position disengages the stopping member from the detent to permit the stopping member to be moved towards the die under the action of the said tension means.

6. The method of producing packs of casingless sausages of plastic substance by die-extruding through plural, elongated, open-ended passages, which comprises telescoping a receptacle over the passages until the base of the receptacle reaches the delivery end of the passages, thereupon extruding the plastic substance through the passages to press the receptacle away from the delivery end thereof until the desired amount of the substance has been extruded, then releasing pressure on the plastic substance to arrest its extrusion, and severing the substance at the delivery end of the passages before the receptacle completely leaves the said delivery end.

7. The method of producing wrapped packages of casingless sausages of plastic substance, by die extrusion through plural, elongated, open-ended passages, which comprises first wrapping a wrapper of paper or other wrapping material around the delivery end of said passages, causing the wrapper to form a cup over the said delivery end, with the base of the cup bearing against the said delivery end, thereupon extruding the plastic material through the passages to displace the wrapper outwards until the desired amount of the substance has been extruded, then releasing the pressure on the plastic substance to arrest its extrusion, and severing the substance at the delivery end of the passages before the wrapper leaves the said delivery end.

8. The method of producing a sealed pack of casingless sausages of plastic substance, by die extrusion through plural, elongated, open-ended passages, which comprises passing a rigid hollow container over the passages, telescoping the container over the passages until the base of the container contacts the delivery end face of the passages, thereupon extruding the plastic substance through the passages and thus causing the container to recede from the said delivery end until the desired amount of the substance has been extruded, arresting the extrusion of the plastic substance before the container is stripped from the said delivery end, thereupon severing the substance at the said delivery end and internally within the container, and finally sealing the open end of the container.

9. The method of producing wrapped packages of casingless sausages of plastic substance, by die extrusion through plural, elongated, open-ended passages, which comprises first wrapping a wrapper of paper or other wrapping material around the passages, causing the wrapper to form a cup over the delivery end of the passages, with the base of the cup bearing against the said delivery end, thereupon extruding the plastic material through the passages to displace the wrapper outwards until the desired amount of the substance has been extruded, arresting the extrusion of the plastic substance before the wrapper completely leaves the passages, thereupon severing the substance at the delivery end of the passages and within the wrapper, removing the wrapper with the pack of sausages from the passages, and closing the open end of the wrapper over the pack.

10. The method of producing a wrapped pack of casingless sausages of plastic substance by die extrusion through plural, elongated, open-ended passages, which comprises first wrapping a wrapper of paper or other wrapping material around the delivery end of the passages, to produce a cup of wrapping material over the said delivery end with the base of the cup in contact with the said delivery end, thereupon telescoping a rigid hollow container over the wrapper to support the same, then extruding the plastic substance through the passages until the desired amount of the substance has been extruded, said container holding and supporting the wrapper while it is receiving the extruded substance and is receding from the passages, thereafter arresting the extrusion and severing the substance at the said delivery end before the wrapper is stripped from the said passages, and subsequently removing the rigid container from the wrapper, leaving the latter with a pack of sausages therein.

WILLIAM MUIR YUILL.